Nov. 19, 1968 C. S. REIS 3,411,948
ELECTROSENSITIVE RECORDING MEDIUM
Filed April 8, 1964
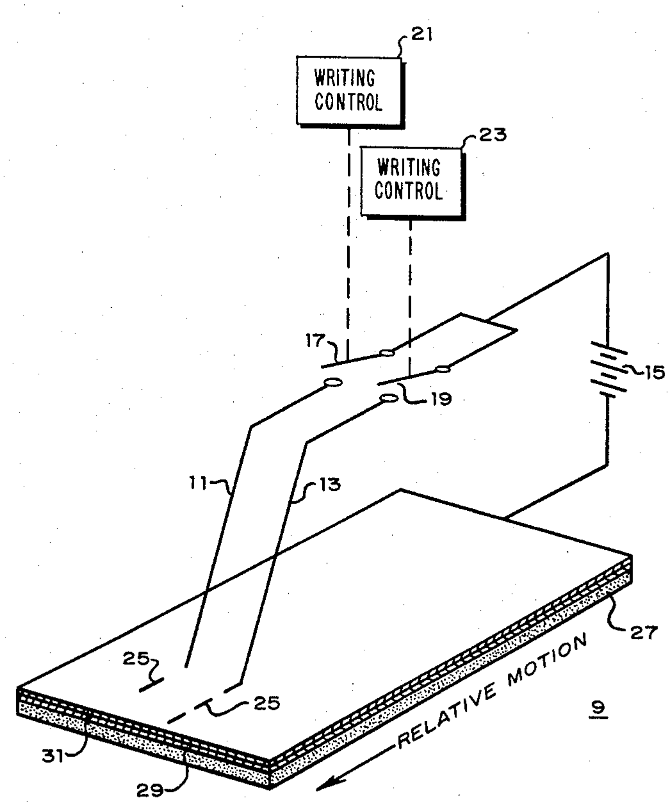
INVENTOR
CHARLES S. REIS
BY A. C. Smith
ATTORNEY United States Patent Office 3,411,948

Patented Nov. 19, 1968

3,411,948

ELECTROSENSITIVE RECORDING MEDIUM

Charles S. Reis, Mountain View, Calif., assignor to Hewlett-Packard Company, Palo Alto, Calif., a corporation of California Filed Apr. 8, 1964, Ser. No. 358,191
1 Claim. (Cl. 117—217)

ABSTRACT OF THE DISCLOSURE

An improved electrosensitive recording medium includes conductive particles of a conductive metal compound in a surface coating disposed on a sublayer of vapor-deposited metal film which is removed in the region adjacent a conductive particle in response to conduction of electrical signal therethrough.

It is an object of the present invention to provide an improved electrosensitive recording medium which responds to low voltage writing signals of the order of 6 to 10 volts.

It is another object of the present invention to provide an electrosensitive recording medium which changes light-transmission characteristics in response to applied electrical writing signals.

It is another object of the present invention to provide a method for making improved electrosensitive recording medium.

In accordance with one embodiment of the present invention, a thin layer of aluminum is deposited on backing material to form a conductive film having a selected resistance per square unit area. A semiconductive layer including trace impurities of zinc and copper is deposited on the conductive film to form a non-electrolytic recording medium for use with apparatus as shown and described in U.S. patent application Ser. No. 287,955 filed on June 14, 1963 by Charles S. Reis to produce contrasting marks in response to applied writing signals as low as 6 to 10 volts.

These and other objects of the invention will be apparent from a reading of this specification and an inspection of the accompanying drawing which shows electrosensitive medium and recording apparatus according to the present invention.

In the drawing, relative motion of the recording medium 9 with respect to the electrodes 11, 13 may be produced by moving the medium 9 with respect to stationary electrodes 11, 13 or by moving the electrodes with respect to stationary medium 9 or by moving both medium 9 and electrodes 11, 13 at dissimilar velocities. Writing signals from source 15 are applied to the electrodes 11, 13 disposed in contact with the surface of medium 9 through switches 17, 19 which are actuated by writing controls 21, 23. Contrasting lines or marks 25 are produced on the medium 9 in response to the writing signals as the electrodes pass along the surface. The electrosensitive recording medium 9 is prepared according to one embodiment of the present invention as follows: Aluminum is vapor-deposited on suitable backing material 27 such as paper or plastic film using well-known methods to form a thin conductive film 29 having a resistance ranging from approximately 2 ohms to approximately 200 ohms per square. The film thickness 29 as measured by its resistance per square should be within this range because low voltage writing signals applied through narrow electrodes in contact with the surface of the recording medium must supply current with sufficiently high current density to evaporate the aluminum in the contacted area, thereby exposing the backing material in the regions through which writing signal flowed. Lower resistances per square (i.e. thicker films) do not evaporate sufficiently to provide suitably contrasting marks and higher resistances per square (i.e. thinner films) require higher writing voltages (typically above 60 to 100 volts). Thus, since the limits are not precise, the term "approximately" above is intended to cover values of resistance per square which are as much as an order of magnitude away from the expressed limits but which are useful with higher power, higher voltage writing signals. In applications where the visual contrast of the exposed backing material against the aluminum film is adequate, no additional coating is necessary. Also if sufficiently transparent backing material is used, the recording thus produced may serve as a master for photographic reproduction or electro-optical reading of the portions of the recording exposed by the evaporated aluminum.

Greater contrast and conventional paper appearance may be obtained by depositing on the aluminum film a semiconductive coating 31 prepared according to one embodiment of the present invention as follows: 400 grams of zinc oxide, 225 grams of toluene, 25 grams of cyclohexane, 25 grams of methyl isobutyl ketone and 25 grams of xylene are combined with a suitable organic binder such as 80 grams of Lucite No. 2044 and 10 grams of Lucite No. 2046. The particulate matter in this mixture is finely divided and thoroughly mixed by agitating in a ball mill for 24 hours. Four grams of copper chloride, 8 grams of acetalamide and 100 grams of ethyl alcohol are added to the agitated mixture to form a fluid coating which is then deposited on the aluminum film by suitable means such as rolling to a wet thickness of about 3 mils. Other impurities of such metals as zinc, indium, bismuth and antimony may also be used in place of copper chloride as an additive to adjust the resistance of the conductive coating to within the resistance range of the aluminum film. The volatile fluids are driven off by heat in a drying oven leaving the particulate matter in a layer 31 about .5 mil thick bonded to the aluminum film 29 by the binder material. The ratio of binder material to particulate matter may also be altered to vary the resistivity of the coating.

The particulate impurities of metals in the coating have dissimilar resistivities. The more highly conductive particles are reduced to the free metals in response to low voltage writing signals applied to them. At the same time the high current density in the aluminum film beneath the conductive particles causes the aluminum to change physical and chemical states, i.e. to explode or evaporate from the backing material 27 in the high current density path of the writing signal. The evaporation of aluminum from the backing material in the presence of oxygen forms aluminum oxide and produces an open circuit in the film beneath the electrode and particle. Writing signal current then flows through the less conductive particles and the aluminum film beneath these particles, causing these particles to reduce to the free metal and causing the aluminum film beneath the particles to change physical and chemical states to produce an open circuit. This permits substantially all of the particulate impurities of metals lying beneath an electrode and having widely varying resistivities to be converted to the free metals, thereby producing a clean, highly contrasting mark. This is not possible using a conventional recording medium which has a thick, highly conductive metallic foil layer beneath the surface layer of impurity particles because only the highly conductive particles conduct writing signals with sufficiently high current density to reduce to free metal. Since the thick metallic foil layer cannot evaporate or otherwise change physical and chemical states to open the writing current path through a highly conductive particle, the less conductive particles do not conduct with sufficiently high current density to reduce to free metal. This produces a contrasting mark in the location of a highly conductive particle surrounded by unreduced particles having the same color as the background. A recording on such conventional medium thus has less contrast and less line definition.

Therefore, greater recording contrast and line definition is achieved using the recording medium of the present invention using writing signals having power levels typically of 200 to 300 milliwatts per electrode because substantially all of the particle impurities having varying conductivities and lying beneath a surface-contacting electrode are reduced to free metals, thereby leaving no particles of background color surrounding a particle reduced to free metal.

I claim:

1. Electrosensitive recording medium comprising:

a backing layer;

a vapor-deposited metallic film on said backing layer having a resistivity within the range from approximately 2 ohms per square to approximately 200 ohms per square;

a conductive coating on said metallic film which includes a matrix of binder and conductive particles of a metal compound that is capable of electrical reduction in situ to the corresponding free metal and which forms an electrical signal conduction path with said metallic film that is disruptable by removal of the metallic film contiguous a conductive particle of said coating in response to conduction of electrical signal therethrough.

References Cited

UNITED STATES PATENTS

| | | | |
|---|---|---|---|
| 2,687,361 | 8/1954 | Traub | 117—107 |
| 2,726,179 | 12/1955 | Ortlieb et al. | 204—2 X |
| 2,836,479 | 5/1958 | Traub et al. | 346—74 |
| 3,122,448 | 2/1964 | Hills et al. | 117—217 X |
| 3,265,524 | 8/1966 | Echeagaray | 117—36.8 |

WILLIAM J. JARVIS, *Primary Examiner.*